United States Patent
Haas et al.

[11] 3,947,183
[45] Mar. 30, 1976

[54] LIQUID CRYSTAL DISPLAY SYSTEM

[75] Inventors: Werner E. L. Haas, Webster; James E. Adams, Ontario; Bela Richter, Rochester, all of N.Y.

[73] Assignee: Xerox Corporation, Stamford, Conn.

[22] Filed: Sept. 25, 1974

[21] Appl. No.: 509,056

[52] U.S. Cl. .................................. 350/160 LC
[51] Int. Cl.² ................................. G02F 1/13
[58] Field of Search ........................... 350/160 LC

[56] References Cited
UNITED STATES PATENTS

| | | | |
|---|---|---|---|
| 3,650,603 | 3/1972 | Heilmeier et al. | 350/160 LC |
| 3,652,148 | 3/1972 | Wysocki et al. | 350/160 LC X |
| 3,703,331 | 11/1972 | Goldmacher et al. | 350/160 LC |

*Primary Examiner*—John K. Corbin
*Assistant Examiner*—Matthew W. Koren
*Attorney, Agent, or Firm*—James J. Ralabate; Michael H. Shanahan; George J. Cannon

[57] ABSTRACT

A system which transforms a liquid crystal composition having a mixture of cholesteric liquid crystal or other optically active materials and nematic liquid crystal materials from an electrically induced dynamic scattering state into an aligned nematic state by changing variables of an applied electrical field, and an imaging system wherein such a liquid crystal member is imaged in a desired image configuration by such an electrical field-induced transition system. Such systems exhibit high optical contrast and may be viewed without the aid of light polarizing devices.

11 Claims, 4 Drawing Figures

U.S. Patent    March 30, 1976    3,947,183
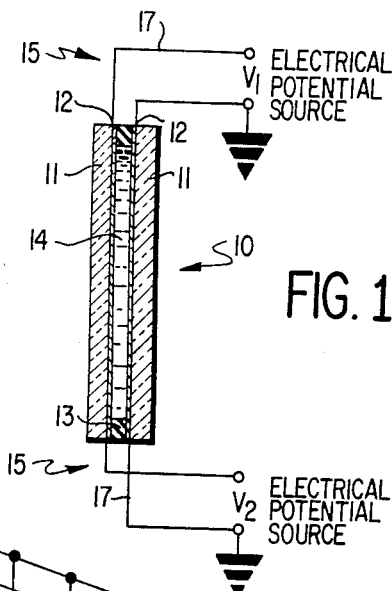
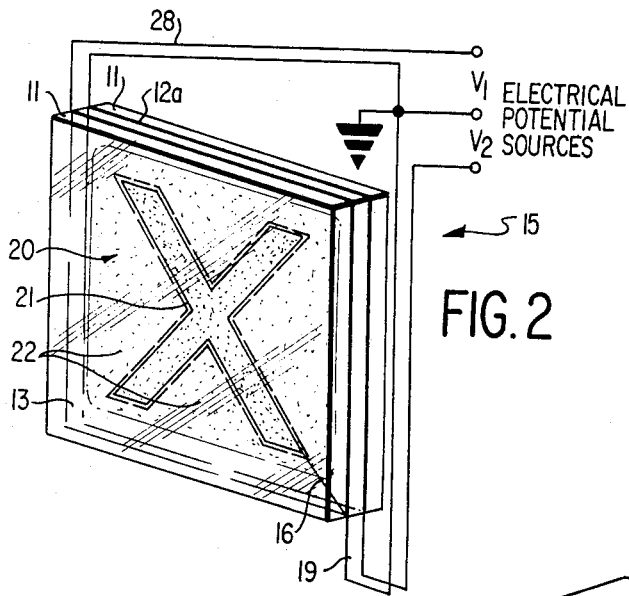
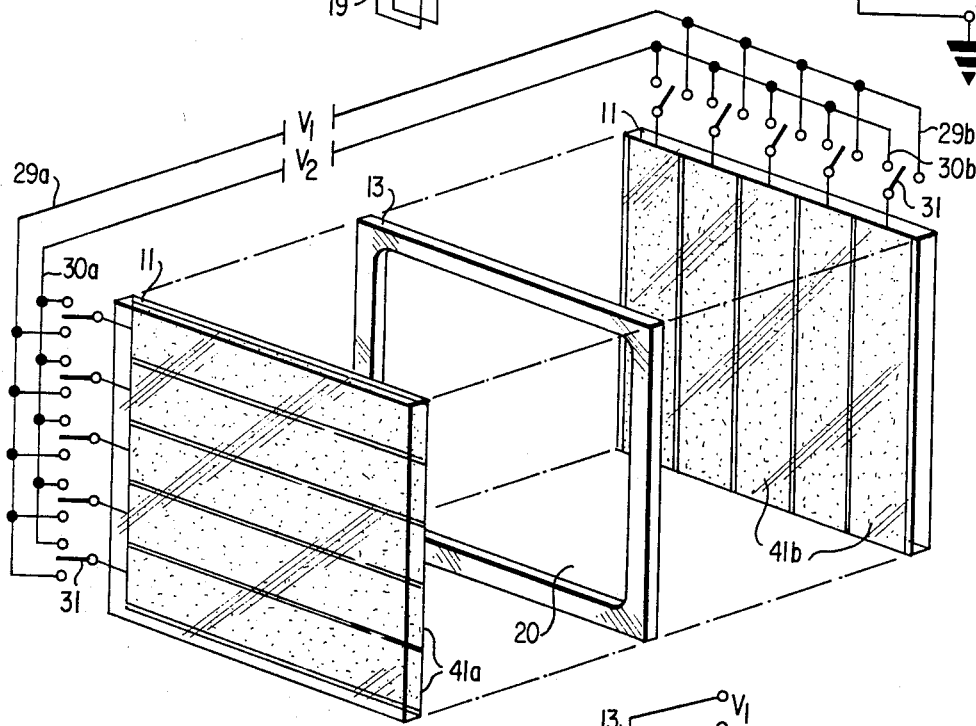
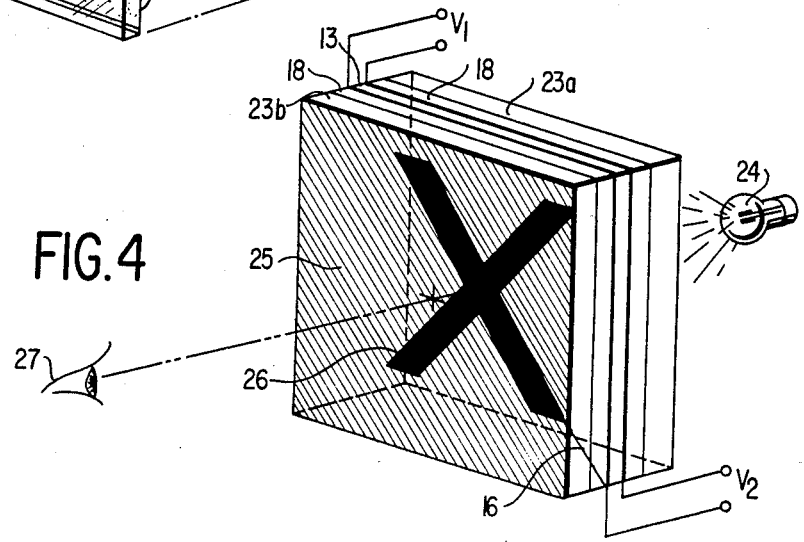

LIQUID CRYSTAL DISPLAY SYSTEM

This invention relates to electro-optic systems, and more specifically to an electro-optic system wherein a liquid crystal composition having a mixture of cholesteric liquid crystals or other optically active materials and nematic liquid crystal materials is used. Furthermore, this invention includes electro-optic cells and imaging systems embodying the inventive liquid crystalline electro-optic system.

Liquid crystal substances exhibit physical characteristics some of which are typically associated with liquids and others which are typically unique to solid crystals. The name "liquid crystals" has become generic to substances exhibiting these dual properties. Liquid crystals are known to appear in three different forms: the smectic, nematic, and cholesteric forms. These structural forms are sometimes referred to as mesophases, thereby indicating they are states of matter intermediate between the liquid and crystalline states. The three mesophase forms of liquid crystals mentioned above are characterized by different structures wherein the molecules of the compound are arranged in a molecular structure which is unique to each of the three mesomorphic states. Each of these structures is well known in the liquid crystal art.

Liquid crystals are known to be sensitive or responsive to a variety of stimulii, including temperature, pressure, and foreign chemical compounds, as well as electrical and magnetic fields. Cholesteric liquid crystals are known to have certain unique responses to electrical fields, as disclosed, for example, in Wysocki et al U.S. Pat. No. 3,652,148; Wysocki et al U.S. Pat. No. 3,642,348; and Haas et al U.S. Pat. No. 3,680,950.

Cholesteric liquid crystals or compositions exhibiting cholesteric liquid crystalline characteristics are typically translucent, for example like a milky white, opalescent material in one of their natural optical states. This state is also known as the focal-conic or "undisturbed" state of cholesteric liquid crystal materials. U.S. Pat. No. 3,652,148 describes a system wherein compositions exhibiting cholesteric liquid crystal characteristics are placed in high strength electrical fields to cause an electrical-field induced phase transition to occur wherein optically negative cholesteric liquid crystal compositions are transformed into a transparent optically positive liquid crystal state, which is believed to structurally resemble the nematic liquid crystal mesophase structure.

Nematic liquid crystals are also known to be responsive to electrical field and currents, and have been used in various electro-optic cells and imaging systems, for example as disclosed in Williams U.S. Pat. No. 3,322,485, Heilmeier et al, U.S. Pat. No. 3,499,112; and Haas U.S. Pat. No. 3,806.230. Many of the known nematic liquid crystalline light valves and display devices make use of the dynamic light scattering characteristics of layers of nematic liquid crystalline materials which have electrical fields placed across the thickness of the layer. See Heilmeier et al., "Dynamic Scattering: A New Electro-Optic Effect in Certain Classes of Nematic Liquid Crystals" Proc. I.E.E.E., Vol. 56, No. 7, July, 1968, pp 1162–1171. The dynamic light scattering is believed to be due to the differential alignment of domains or swarms of birefringent liquid crystalline molecules in the electric field affected areas in such systems.

Mixtures of cholesteric and nematic liquid crystals have also shown responses to electrical fields, as shown for example in Heilmeier, G.H. and Goldmacher, J.E., Appl. Phys. Letters Vol. 13, No. 4, p. 132 (1968), and Soref, R.A., "Thermo-Optic Effects in Nematic-Cholesteric Mixtures," J. Applied Physics, Vol. 41, No. 7, June, 1970, pp 3021–3026, which disclose optical changes of induced states in nematic-cholesteric mixtures, and in Haas, W., Adams, J., and Flannery, J.B., "ac-FIELD-INDUCED GRANDJEAN PLANE TEXTURE IN MIXTURES OF ROOM-TEMPERATURE NEMATICS AND CHOLESTERICS" Phys. Rev. Letters, Vol. 24, No. 11, p 511(c), (1970), which discloses that certain mixtures of cholesteric and nematic liquid crystals exhibit dynamic scattering in response to an electrical field.

However, in new and growing areas of technology such as liquid crystal electro-optic and imaging systems, new methods, apparatus, compositions, and articles of manufacture continue to be discovered for the application of the new technology in surprising new and improved advantageous modes. For example, the present invention provides imaging systems which produce high contrast images which are observable either with or without the aid of light polarizing devices.

BRIEF SUMMARY OF THE INVENTION

It is, therefore, an object of this invention to provide a novel electro-optic system.

It is another object of this invention to provide a novel liquid crystalline imaging system.

It is another object of this invention to transform a liquid crystalline composition comprising a mixture of cholesteric liquid crystals or other optically active materials, and nematic liquid crystal materials from its electrical field induced dynamic scattering state into an aligned nematic state by different applied electric fields.

It is another object of this invention to provide a liquid crystal imaging system which can be viewed in transmitted light without the aid of light polarizing devices.

It is another object of this invention to provide novel, liquid crystal compositions suitable for use in the A.C. or D.C. electrical field transition system of the present invention.

The foregoing objects and others are accomplished in accordance with this invention by providing a layer of liquid crystal composition, comprising a mixture of cholesteric liquid crystals or other optically active materials and nematic liquid crystal materials, in an electrical field and transforming that composition from its electrical current induced dynamic scattering state into an aligned nematic state by changing variables of the applied electrical field, and an imaging system wherein such a liquid crystal member is imaged in a desired image configuration by such a system.

BRIEF DESCRIPTION OF THE DRAWINGS

For a better understanding of the invention as well as other objects and further features thereof, reference is made to the following detailed disclosure of preferred embodiments of the invention taken in conjunction with the accompanying drawings thereof, wherein:

FIG. 1 is a partially schematic, cross-sectional view of an electro-optic cell embodying the present invention.

FIG. 2 is a partially schematic, isometric view of an electro-optic imaging cell embodying the present invention wherein the desired image is defined by the shape of at least one of the electrodes.

FIG. 3 is a partially schematic, exploded isometric view of an electro-optic imaging cell of the present invention wherein a liquid crystal imaging composition is imaged by an X-Y electrode grid address system.

FIG. 4 is a partially schematic, isometric view of a typical electro-optic imaging cell embodying the present invention wherein said cell is viewed between polarizers.

DETAILED DESCRIPTION OF THE PREFERRED EMBODIMENTS

In FIG. 1 a typical electro-optic liquid crystal cell 10, sometimes referred to as an electroded sandwich cell, is shown embodying the present invention, wherein a pair of transparent plates 11 having substantially transparent conductive coatings 12 upon the contact surfaces thereof, comprise a substantially parallel pair of transparent electrodes. Cells wherein both electrodes are substantially transparent are preferred where the imaging member is to be viewed using transmitted light; however, a liquid crystal cell may also be viewed using reflected light thereby requiring only a single transparent electrode while the other may be opaque and/or reflecting. The transparent electrodes are separated by spacing-gasket member 13 which includes voids which form one or more shallow cups which contain the liquid crystal material in a film or layer which comprises the active element of the electro-optic cell. In the present invention the layer of liquid crystal material comprises a mixture of cholesteric liquid-crystals or other optically active materials and nematic liquid crystal materials. An electrical field is created between the electrodes by external circuit 15 which typically comprises electrical potential sources $V_1$ and $V_2$ which are connected across portions of the two electrodes through leads 17. The circuit 15 may also contain any suitable switching means that is desired.

The electro-optic effect of the liquid crystal members of the present invention, which may also be used as a liquid crystal electro-optic imaging system, is in part described in U.S. Pat. No. 3,652,148, the entire disclosure of which is hereby expressly incorporated by reference in the present specification. In the system described in that patent and in the system of the present invention, a mixture or composition exhibiting cholesteric liquid crystal characteristics is used in an electrode sandwich configuration embodiment such as that described in FIG. 1 so that high strength electrical fields across the liquid crystal composition film cause an electrical field-induced phase transition to occur wherein the optically negative cholesteric liquid crystal composition is transformed into an optically positive liquid crystal state. The electro-optic cholesteric liquid crystal or optically active compositions suitable for use in the present invention typically have a transition threshold field strength at or above which the advantageous transition takes place. This transition is believed to be the result of the cholesteric liquid crystal transforming into the nematic liquid crystal mesophase structure. This is believed to be a bulk effect which affects the entire cross-section of the transformed portions of the composition layer.

But in the system of the present invention, the cholesteric-nematic mesophase transition does not occur between an initial cholesteric material in its natural state unaffected by any electrical field, and the subsequent electrical field induced phase transformed nematic state. Rather, the present inventors have found that a cholesteric-nematic phase transition will occur when a mixture of cholesteric liquid crystals or other optically active materials, and nematic materials, which is initially in an A.C. or D.C. electrically induced dynamic scattering state, is further affected by an electrical field of different voltage and/or frequency, to transform the mixture into an induced, transparent, nematic state. In terms of visual appearance, this transition is from a bright, highly light scattering layer having small, transient, birefringent domains therein, to a substantially transparent aligned nematic state.

However it has now been found that not only can a transition be achieved in mixtures of cholesteric liquid crystals or other optically active materials, and nematic liquid crystals from the electrically induced dynamic scattering state to the electrical field induced transparent aligned nematic state, but even more surprising, that such a system is capable of good switching speeds. In addition, it has been found that this inventive transition system can be used as a high contrast imaging system, without the necessity for using light polarizing, or other contrast enhancing devices as required in previous imaging systems. A reason for the increased contrast capability of the present system is that the dynamic scattering state is significantly brighter than the non-field affected states such as the normal focal-conic state. The present system also operates at threshold conditions which are more easily achieved than in other systems.

In FIG. 2 a preferred embodiment of the electro-optic cell described in FIG. 1 is shown wherein the desired image is defined by the shape of the electrodes, and therefore by the shape of the electrical field created by the electrodes. This electro-optic imaging cell comprises transparent plates 11 separated by spacer gasket 13 having void area 20 filled with the mixture of cholesteric liquid crystals or other optically active material, and nematic liquid crystal materials, with that area comprising substantially the entire area of spacer gasket 13. A desired image is defined by the shape of a substantially transparent conductive coating shown at 21, which is affixed to the inner surface of one or more of the transparent support plates 11. The embodiment illustrated in FIG. 2 shows only one of the two electrodes on both sides of the imaging materials in image configuration; however, it will be understood by those skilled in the art that both electrodes could easily be made in a matched, congruent pair to define the same desired image. In addition to image shaped substantially transparent conductive coating 21, one or both of the plates 11 also have affixed to the inner surfaces thereof a second substantially transparent coating 22 which has a shape complementary to the image shaped coating 21, but spaced apart from or otherwise electrically insulated from coating 21. The coating 22 may be referred to as a background electrode complementary to imagewise electrode 21. In FIG. 2, the electrode 12a on the opposite side of gasket 13 from shaped electrodes 21 and 22, is shown as a full area electrode or substantially transparent coating 12a, but in various embodiments of the present invention the opposte electrode 12a may comprise complementary shaped electrodes like electrodes 21 and 22. While electrodes 21 and 22 are designed for separate operation, or operation at different electrical conditions, it will be appreciated that they may be operated together or at the same conditions as a substantially full-area electrode.

A very thin or substantially invisible conductor 16 is typically used in this embodiment to electrically connect image shaped electrode 21 to external circuit 15. Conductor 16 is spaced from or otherwise electrically insulated from the complementary background electrode 22. Conductor 16 is connected to conductor 19 which leads to electrical potential source $V_2$. Complementary background electrode 22 is connected to conductor 28 which leads to electrical potential source $V_1$. Opposite electrode 12a is illustrated as being electrically connected to a common ground between sources $V_1$ and $V_2$. However, if the opposite electrode comprises separate shaped electrodes like electrodes 21 and 22, each of those separate shaped electrodes would typically be connected across the same electrical potential source as their congruent shaped electrode on the other side of the gasket and imaging material.

In operation, one of the shaped electrodes, for example a background shaped electrode 22, is electrically connected to one terminal of an electrical potential source such as source $V_1$, the other terminal thereof being connected to a full-area or congruent shaped electrode on the opposite side of the imaging material, and the source $V_1$ provides an electrical potential sufficient to cause dynamic scattering in that portion of the layer of liquid crystal imaging material which geometrically corresponds to the shaped background electrode. An image shaped electrode, for example electrode 21, is electrically connected to one terminal of an electrical potential source such as source $V_2$, the other terminal thereof being connected to a full-area or congruent shaped electrode on the opposite side of the imaging material, and the source $V_2$ provides an electrical potential sufficient to produce an electrical field across the layer of liquid crystal imaging material, which field is sufficiently strong to cause the imaging material to transform to its transparent induced nematic state. The transparent image in a light scattering background may be viewed in either transmitted or reflected light. Where reflected light is used, one of the electrodes may be opaque if desired. Furthermore, by varying the potential and/or frequency (if the source is A.C.) a variety of imaging combinations are possible, and various portions of the imaging composition may readily be switched from one state to another. For example in the system described above, if the potential of source $V_2$ is varied so that it approximates the stated potential of source $V_1$, the transparent image will disappear, and the full area will assume the dynamic scattering state. In similar fashion, any shaped electrode area may be switched from conditions producing the dynamic scattering state to conditions producing the transparent induced nematic state in the imaging material 10a. Hence either transparent images in a light scattering background, or light scattering images in a transparent background may be produced in the present invention.

In the electro-optic liquid crystal cells described herein the electrodes may comprise any suitable transparent conductive material. Typical suitable transparent, conductive electrodes include glass or plastic substrates having substantially transparent and continuously conductive coatings of conductors such as tin, indium oxide, aluminum, chromiun, tin oxide, or any other suitable conductor. These substantially transparent conductive coatings may be evaporated or otherwise applied onto the transparent substrate. NESA glass, a tin oxide coated glass manufactured by the Pittsburgh Plate Glass Company, is a commercially available example of a typical transparent, conductive electrode material.

The spacer 13 which separates the transparent electrodes and contains the liquid crystal film between said electrodes, is typically chemically inert, substantially insulating, may or may not be transparent, and has appropriate dielectric characteristics. Materials suitable for use as insulating spacers include cellulose acetate, cellulose triacetate, cellulose acetate butyrate, polyurethane elastomers, polyethylene, polypropylene, polyesters, polystyrene, polycarbonates, polyvinylfluoride, polytetrafluoroethylene, polyethylene terephthalate and mixtures thereof.

Such spacers, also approximately define the thickness of the imaging layer or film of liquid crystals, and are preferably of a thickness in the range of about 10 mils or less. Optimum results are typically attained with spacers in the thickness range between about ¼ mil and about 5 mils.

The layer or film of liquid crystal composition 14 comprises a mixture of cholesteric liquid crystals or other optically active materials and nematic liquid crystal materials. Mixtures of liquid crystals can be prepared in organic solvents such as chloroform, petroleum ether, methylethyl ketone and others, which are typically subsequently evaporated from the mixture thereby leaving the liquid crystalline mixture in a desired location. Alternatively, the individual liquid crystals of the mixture can be combined directly by heating the mixed components above the isotropic transition temperature. Such solutions or melts of liquid crystals are particlarly suitable for use in providing layers of liquid crystals on surfaces.

The cholesteric component of the liquid crystal mixture may comprise any suitable cholesteric liquid crystal, mixture or composition having cholesteric liquid crystal characteristics. Cholesteric liquid crystals suitable for use in the present invention include derivatives from reactions of cholesterol and inorganic acids; for example, cholesteryl chloride, cholesteryl bromide, cholesteryl iodide, cholesteryl fluoride, cholesteryl nitrate; esters derived from reactions of cholesterol and carboxylic acids; for example, cholesteryl crotonate; cholesteryl nonanoate, cholesteryl hexanoate; cholesteryl formate; cholesteryl chloroformate; cholesteryl propionate; cholesteryl acetate; cholesteryl linoleate; cholesteryl linolenate; cholesteryl oleate; cholesteryl erucate; cholesteryl butyrate; cholesteryl caprate; cholesteryl laurate; cholesteryl myristate; ethers of cholesterol such as cholesteryl decyl ether; cholesteryl lauryl ether, cholesteryl oleyl ether; cholesteryl dodecyl ether; carbamates and carbonates of cholesterol such as cholesteryl oleyl carbonate; cholesteryl ethyl carbonate; cholesteryl butyl carbonate; cholesteryl geranyl carbonate; cholesteryl erucate; cholesteryl cetyl carbonate; cholesteryl-p-nonylphenyl carbonate; cholesteryl-2-(2-ethoxyethoxy) ethyl carbonate; cholesteryl-2-(2-butoxyethoxy) ethyl carbonate; cholesteryl 1-2-(2-methoxyethoxy) ethyl carbonate; cholesteryl heptyl carbamate; peptides such as poly-γ-benzyl-l-glutamate derivatives of beta sitosterol such as sitosteryl chloride; and active amyl ester of cyanobenzylidene amino cinnamate. The alkyl groups in said compounds are typically saturated or unsaturated fatty acids, or alcohols, having less than about 25 carbon atoms, and unsaturated chains of less than about 5 double-bonded olefinic groups. Aryl groups in the above compounds typically comprise simply substituted benzene ring compounds. Any of the above compounds and mixtures thereof may be suitable cholesteric liquid crystal materials in the advantageous system of the present invention.

Other optically active, non-mesomorphic materials may be used with, or instead of, the aforementioned cholesteric liquid crystal materials in the imaging compositions of the present invention. Typical suitable optically active, nonmesomorphic materials include: derivatives of alcohols such as 1-menthol, 1-linanool, d-mannitol, d-bornel and d-quercitol; derivatives of ketones such as d-camphor, d-3-methylcyclohexanone 1-methone and 1-6-isopropyl-3-cyclohexanone; derivatives of carboxylic acids such as d-citronellic acid, 1-citronellic acid, d-chaulmoogric acid, 1-campholic acid, 1-arabonic acid, d-tartaric acid and 1-ascorbic acid, derivatives of aldehydes such as d-citronellal; derivatives of alkenes such as 1-B-pinane, d-silvesterene, and d-limonene; derivatives of amines such as 1-2-methylpiperidine; derivatives of nitriles such as d-mandelonitrile; derivatives of amides such as d-hydrocarbamide; and mixtures thereof.

Nematic liquid crystal materials suitable for use as components of the liquid crystal composition in the present invention include: p-azoxyanisole, p-azoxyphenetole, p-butoxybenzoic acid, p-methoxy-cinnamic acid, butyl-p-anisylidene-p-aminocinnamate, anisylidene para-amino-phenylacetate, p-ethoxy-benzalamino-a-methyl-cinnamic acid, 1,4-bis (p-ethoxy benzylidene) cyclo-hexanone, 4,4'-dihexyl-oxybenzene, 4,4'-diheptyloxybenzene, anisal-p-amino-azobenzene, anisaldazine, n,n'-nonoxybenze-toluidine; anils of the generic group (p-n-alkoxy-benzylidene-p-n-alkylanilines), such as p-methoxy benzylidene p-n-butylaniline, and p-ethoxy benzylidene p'-n-butylaniline; chlorostilbenes, mixtures of the above and many other.

The above list of materials are not intended to be exhaustive or limiting. The lists disclose a variety of representative materials suitable for use in the electro-optic liquid crystal composition or mixture which comprises the active element in the advantageous system of the present invention.

Preferred liquid crystal compositions having the mixed cholesteric-nematic properties, suitable for use in the present invention, are mixtures comprising p-[N-(p-butoxy-benzylidene) amino] phenylacetate; p-anisalamino-phenylacetate; p-anisalamino valerophenone; N-(p-ethoxy-benzylidene)-p-butylaniline and N-(p-butoxybenzylidene)-p-butylaniline; and N-(p-methoxybenzylidene)-p-butylaniline; with one or more of the following additional components: cholesteryl chloride; cholesteryl erucate; 2-(-2-ethoxy) ethyl carbonate; or cholesteryl geranyl carbonate.

While the foregoing combinations of materials are preferred for use in the present invention, it should be appreciated that any mixture of cholesteric liquid crystals or other optically active materials, and nematic liquid crystals, which will exhibit both electrically induced dynamic scattering, and the transparent, electrical field induced aligned nematic state, is suitable for use in the present invention. While the entire theory of why such mixtures exhibit this unique combination of properties, is not known it is believed that the key to that combination of properties may be related to the dielectric anisotropy of the individual components of the mixture, as well as of the mixture as a whole.

The sources of electrical potential used in the present invention may be either D.C., A.C. or combinations thereof. The use of A.C. fields provides an additional degree of freedom, since frequency, as well as voltage may then be varied to control the desired liquid crystal states and transitions. A typical set of D.C. operating conditions in an about 8 micron thick cell of the present invention is: ON (dynamic scattering) state — about 8 volts, OFF (transparent nematic) state — about 30 volts. However, these voltage values are only exemplary, and the voltage values will vary considerably for various mixtures of liquid crystal materials, and for various cell thicknesses. In addition, the use of A.C. potential provides means for adjusting contrast between the OFF and ON states by changing the frequency of the potential input. It has been found that the contrast between the two states used in the present invention increases with decreasing frequency of the applied A.C. electrical potential. This phenomenon is further illustrated by the data given in Examples I and II, below.

Another preferred embodiment of the electro-optic display cell of the present invention is schematically illustrated in FIG. 3 in exploded isometric format. The cell of FIG. 3 includes plates 11 sandwiching gasket 13 having void 20 therein for the imaging composition, as in the embodiments of FIGS. 1 and 2. But here the electrodes on plates 11 are in the form of strips of substantially transparent conductive material, with a plurality of such strips 41 spaced apart or otherwise electrically insulated from each other, and extending in a parallel grid arrangement across the inner face of each plate 11. The electrode strips 41a on the inside of the front plate are oriented a different direction, preferably rotated about 90°, from the direction in which the electrode strips 41b cross the inside of the rear plate. The electrode strips thus formed crossed X-Y grids having a layer of imaging composition therebetween. By selectively connecting any one of the front strips 41a and any one of the rear strips 41b across an electrical potential source such as $V_1$ or $V_2$, any area between two crossing electrode strips may be electrically activated to cause the imaging composition in that area to assume either its dynamic scattering state or its transparent induced nematic state.

The cell of FIG. 3 having the X-Y grid electrodes is schematically provided with circuitry so that any pair of strips selected from groups 41a and 41b may be connected across one of two electrical potential sources $V_1$ or $V_2$. In the present invention, all portions of the area of the display cell typically have an electrical potential provided across the thickness of the imaging composition, with some portions of that area having an electrical potential sufficient to cause the imaging composition in those portions to exhibit dynamic scattering, while other portions have an electrical potential sufficient to transform the imaging composition into its transparent electrical field induced nematic state. The X-Y grid electrode system shown in FIG. 3 includes conductors 29a and 29b to connect any desired electrode strip 41a and any desired electrode strip 41b across electrical potential source $V_1$, which may, for example, provide potential sufficient to cause an imaging composition of the present invention to exhibit dynamic scattering. And, conductors 30a and 30b may be used to connect any desired strip 41a and any desired strip 41b across electrical potential source $V_2$, which may, for example, provide potential sufficient to transform an imaging composition of the present invention into its transparent induced nematic state. Each strip is schematically illustrated with a switching means 31 by which the electrode strip may be electrically connected to a conductor 29a, 29b, 30a, or 30b. In the manner described above, the area of the imaging composition between any two crossing strips 41a and 41b may be selectively activated so that the imaging composition in that area provides a light scattering unit in a transparent background, or vice-versa.

While the imaging system of the present invention has such high contrast that it may be used without polarizers or other contrast enhancing devices, in some embodiments or applications of the system it may be desirable to use such devices. For example, FIG. 4 shows an electro-optic imaging cell comprising a pair of substantially transparent electrodes 18 sandwiching the spacer 13 containing a liquid crystal film, shown being observed between polarizers 23. As described earlier herein, mixtures of cholesteric liquid crystals or other optically active materials, and nematic liquid crystals, in the electrically induced dynamic scattering state are diffusely light scattering, having many small birefrigent domains; conversely, such mixtures transformed into the induced aligned nematic state are substantially transparent. Hence, when such a mixture is viewed between crossed polarizers, it is not visible with transmitted light when the mixture is in the transparent aligned nematic state, but it is brightly visible when the mixture is in the birefrigent dynamic scattering state. As illustrated in FIG. 4, light from source 24 is plane polarized by polarizer 23a. In traversing the liquid crystalline film it remains plane polarized in the transformed (transparent) aligned nematic areas 26, and ceases to be plane polarized in the birefrigent dynamic scattering areas 25. In passing through polarizer 23b, which is adjusted to a suitable angle, the aligned nematic areas 26 appear dark and the birefrigent dynamic scattering areas 25 appear bright thereby defining a dark image on a light background.

Although the embodiment of the advantageous system of the present invention illustrated in FIG. 4 shows a liquid crystal film being observed between polarizers, it will be appreciated that other means for enhancing the image or non-image areas may perform a function similar to that of the polarizers in the illustrated embodiment. For example, in addition to polarizers, edge-lighting systems, optical filter systems, or any other suitable means may be used to enhance the quality of the desired image. It is therefore clear that any desired image may be created in dark-on-light, light-on-dark, or even colored image-background combinations.

The imaging system of the present invention has been explained, for purposes of simplicity, in conjunction with the single, electrode sandwich mode. However, it should be appreciated that the present invention may be used in any embodiments capable of producing the requisite electrical potentials and fields. For example it may be used in large area displays, or in stacked nixie tube type applications, as shown in U.S. Pat. No. 3,622,224. Other suitable applications include bit-matrix address systems, as well as electric stylus and electron beam address systems as shown in U.S. Pat. No. 3,652,148.

In all of the aforementioned embodiments, or in various combinations thereof, it will be appreciated that the imaging system of the present invention may be used to create any desired figure or character in any language or number system or any other desired design or image according to the application desired by its user.

While the present invention usually exhibits a transition from the highly visible dynamic scattering state at relatively low electrical potentials, to the transparent, field-induced, aligned nematic state at relatively high field strengths, surprisingly, it has been found that in some embodiments the field-induced aligned nematic state may appear at field strengths which are lower than those which produce dynamic scattering in the same liquid crystal composition. The theory of this phenomenon is presently unknown.

The following examples further specifically define the present invention with respect to the electrical transformation of a mixed cholesteric-nematic liquid crystal composition from a dynamic scattering state into the electrical field induced aligned nematic state. Parts and percentages are by weight unless otherwise indicated. The examples below are intended to illustrate various preferred embodiments of the novel liquid crystal electro-optic display system.

EXAMPLE I

An electro-optic liquid crystal cell is prepared by providing a tin oxide coated glass slide, providing on the conductive side of said slide an about ½ mil thick spacer gasket of Tedlar, a polyvinylfluoride resin film available from Dupont, having a small, square opening cut therein, and a second tin oxide coated glass slide over the spacer gasket and enclosing a liquid crystalline composition having cholesteric optical characteristics between the conductively coated slides and within the opening in the spacer gasket. A mixture of cholesteric and nematic liquid crystals is prepared by initially mixing about one part p-[N-(p-butoxybenzylidene)amino] phenylacetate; about one part p-anisalamino-phenylacetate; about two parts p-anisalamino valerophenone; about one part of a mixture of about 64% N-(p-ethoxybenzylidene)-p-butylaniline and about 35% N-(p-methoxybenzylidene)-p-butylaniline. To that initial mixture, an additional about 3% of cholesteryl chloride is added, and that mixture is placed in the cell during cell fabrication. The electrically conductive tin oxide coatings of the two slide electrodes are electrically connected to circuitry for providing either D.C. or A.C. electrical potential across the electrodes. The cell is placed without polarizers, between a source of light of wavelength of about 5460A, and a photodiode which is connected to a voltmeter for reading its output which increases as the photodiode is increasingly exposed to light. As a control embodiment, the photodiode first gives an output voltmeter reading of about 2 mV. when no field is applied across the cell, and gives a reading of about 20 mV. when an about 50 V., D.C. field is applied thereby transforming the mixture to its transparent, aligned nematic state. A D.C. voltage of about 6-8V. gives a photodiode output reading of less than about 1.0 mV, thereby illustrating the increased reflection and absorption of the mixture when in its dynamic scattering state. The effects of A.C. fields (expressed as r.m.s. voltages values), and the variation in effects as the A.C. frequency increases are shown by the approximate values given below:

| A.C. Frequency | Low Field | Photodiode Output Signal | High Field | Photodiode Output Signal |
|---|---|---|---|---|
| 5 cps | 6v. | 0.7 mV | 50 v. | 4.0 mV |
| 10 cps | 6v. | 1.0 mV | 50 v. | 2.5 mV |
| 20 cps | 6v. | 1.2 mV | 50 v. | 3.0 mV |
| 40 cps | 6v. | 15.0 mV | 50 v. | 17.0 mV |

This data indicates that as A.C. frequency increases, the contrast between the dynamic scattering state and the transformed aligned nematic state, decreases.

EXAMPLE II

The cell of Example I is used in the same system described in Example I, except that the cell is placed between substantially crossed polarizers (as shown in FIG. 4), and those crossed polarizers are between the photodiode and a source of light of wavelength of about 6328A. As a control experiment the photodiode first gives an output voltmeter reading of about $20.0 \times 10^2$ mV. when no field is applied; this is due to the great birefringence of the liquid crystal mixture which rotates light to allow it to easily pass through the crossed polarizers. The photodiode output voltmeter gives a reading of about 24.0 mV when an about 100 V., D.C. field is applied. The effects of A.C, fields (expressed as r.m.s. voltage values) and the variation in effects as the A.C. frequency increases are shown by the approximate values given below:

| A.C. Frequency | Low Field | Photodiode Output Signal | High Field | Photodiode Output Signal |
|---|---|---|---|---|
| 40 cps | 6 v. | 36.0 mV. | 100 v. | 18.0 mV. |
| 100 cps | 6 v. | 32.0 mV. | 100 v. | 18.0 mV. |
| 150 cps | 6 v. | 28.0 mV. | 100 v. | 20.0 mV. |
| 250 cps | 6 v. | 24.0 mV. | 100 v. | 20.0 mV. |

Between crossed polarizers, the cell appears brighter when in the dynamic scattering state than when in the aligned nematic state. However, the foregoing data continues to show the trend of the data of Example I, that the contrast between the dynamic scattering state and the transformed aligned nematic state decreases as A.C. field frequency increases.

EXAMPLES III–VI

The initial mixture of Example I is used in the systems of both Examples I and II, except in each of Examples III–VI the following material replaces the 3% cholesteryl chloride of the final mixture of Example I:

III. About 5% cholesteryl erucate; about ¼ mil of this final mixture transforms at about 12–15V., D.C.
IV. About 1% cholesteryl chloride.
V. About 5% 2-(2-ethoxyethoxy) ethyl carbonate; about ¼ mil of this final mixture transforms at about 100–125 V., D.C.
VI. About 5% cholesteryl geranyl carbonate; about ¼ mil of this final mixture transforms at about 100–125 V., D.C.

EXAMPLE VII

An electro-optic cell is prepared as described in Example I, above, except that the second tin oxide coated glass slide has an X-shaped image area separated (by etching or otherwise physically removing the coating around the shaped area) from a complementary background area in that portion of the slide which covers the opening in the spacer gasket, and the image area and the complementary background area of the second slide are provided with separate electrical leads for separately connecting them, along with the first conductive slide, to a source of A.C. or D.C. electrical potential. The low voltages or fields described in Example I are placed across the background area electrode and the first slide, and the higher voltages or fields described in Example I are placed across the shaped image area electrode and the first slide, thereby producing a transparent induced nematic image in a light scattering background, with a variety of contrasts corresponding to each different set of low and high field strengths as described in Example I.

The system of Example II and compositions of Example III–VI may also be used in the cell of Example VII.

Although specific components, proportions and arrangements of elements have been stated in the above description of preferred embodiments of this invention, other equivalent components and arrangements of elements may be used with satisfactory results and various degrees of quality, or other modifications may be made herein to synergize or enhance the construction of the invention to thereby increase its utility. It will be understood that such changes of details, materials, arrangements of parts, and uses of the invention described and illustrated herein, are intended to be included within the principles and scope of the claimed invention.

What is claimed is:

1. A method of imaging, comprising: providing a layer of liquid crystalline composition comprising a mixture of p-[N - (p-butoxy-benzylidene) amino] phenylacetate; p-anisalaminophenylacetate; p-anisalamino valerophenone; N-(p-ethoxy-benzylidene)-p-butylaniline and N-(p-butoxybenzylidene)-p-butylaniline; and N-(p-methoxybenzylidene)-p-butylaniline; and, an optically active material selected from the group consisting of cholesteryl chloride; cholesteryl erucate; 2-(2-ethoxy) ethyl carbonate; and cholesteryl geranyl carbonate;

applying to one portion of the area of said layer an electrical potential across the thickness of said layer, said electrical potential having sufficient strength to place said mixture in its electrically induced dynamic scattering state; and applying to another portion of the area of said layer an electrical field across the thickness of said layer, said electrical field having sufficient strength to transform said mixture to its electrical field induced aligned nematic state, thereby producing an image comprising said one and another portions of said layer.

2. The method of claim 1 wherein said electrical field is a D.C. electrical field.

3. The method of claim 1 wherein said electrical field is an A.C. electrical field.

4. The method of claim 3, wherein said layer of liquid crystal composition is of a thickness in the range of about ¼ mil to about 5 mils.

5. The method of claim 1, wherein said layer of liquid crystal composition is of thickness not greater than about 10 mils.

6. The imaging method of claim 1, further including the step of viewing said layer of liquid crystal composition in transmission.

7. The imaging method of claim 6, wherein the layer of liquid crystal composition is between substantially crossed polarizers.

8. The method of claim 1, wherein the electrical potential is applied to said one portion of the area of said layer by initially applying to said one portion across the thickness of said layer an electrical field having field strength sufficient to transform said mixture to its electrical field induced aligned nematic state, and thereafter changing the strength of said electrical field to said electrical potential having sufficient strength to place said mixture in its electrically induced dynamic scattering state, thereby switching said one portion of the area of said layer from its electrical field induced transparent aligned nematic state, to its electrically induced dynamic scattering state.

9. The method of claim 1, wherein the electrical field is applied to said another portion of the area of said layer by initially applying to said another portion across the thickness of said layer an electrical potential having sufficient strength to place said mixture in its electrically induced dynamic scattering state, and thereafter changing the strength of said potential to provide to said another portion said electrical field having sufficient strength to transform said mixture to its electrical field induced aligned nematic state, thereby switching said another portion of the area of said layer from its electrically induced dynamic scattering state, to its electrical field induced transparent aligned nematic state.

10. The method of claim 1, wherein said one portion is in an image configuration.

11. The method of claim 10, wherein said another portion is in another image configuration which is complementary to said image configuration of said one portion.

* * * * *

UNITED STATES PATENT AND TRADEMARK OFFICE
CERTIFICATE OF CORRECTION

PATENT NO. : 3,947,183
DATED : March 30, 1976
INVENTOR(S) : Werner E. L. Haas et al It is certified that error appears in the above–identified patent and that said Letters Patent are hereby corrected as shown below:

Column 5, line 64, "chromiun" should read -- chromium --.

Column 10, line 42, "64%" should read -- 65% --.

Signed and Sealed this

Sixteenth Day of November 1976

[SEAL]

Attest:

RUTH C. MASON
*Attesting Officer*

C. MARSHALL DANN
*Commissioner of Patents and Trademarks*